United States Patent
Kim et al.

(10) Patent No.: US 9,942,438 B2
(45) Date of Patent: Apr. 10, 2018

(54) IMAGE READING APPARATUS

(71) Applicant: FUJI XEROX CO., LTD., Tokyo (JP)

(72) Inventors: Dalyong Kim, Kanagawa (JP);
Sangchun Park, Kanagawa (JP);
Hyundeok Ha, Kanagawa (JP);
Jongsung Yoon, Kanagawa (JP);
Jinmyung Kim, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/994,886

(22) Filed: Jan. 13, 2016

(65) Prior Publication Data
US 2017/0019555 A1 Jan. 19, 2017

(30) Foreign Application Priority Data

Jul. 17, 2015 (JP) ................................. 2015-142903

(51) Int. Cl.
| | | |
|---|---|---|
| H04N 1/04 | (2006.01) | |
| H04N 1/193 | (2006.01) | |
| H04N 1/12 | (2006.01) | |
| H04N 1/107 | (2006.01) | |

(52) U.S. Cl.
CPC ........... *H04N 1/193* (2013.01); *H04N 1/1077* (2013.01); *H04N 1/121* (2013.01); *H04N 2201/0081* (2013.01)

(58) Field of Classification Search
CPC ...... H04N 1/193; H04N 1/1077; H04N 1/121; H04N 2201/0081
USPC ..... 358/482, 483, 497, 496, 474; 250/208.1, 250/239, 234–236; 399/211
See application file for complete search history.

(56) References Cited

U.S. PATENT DOCUMENTS

| | | | | |
|---|---|---|---|---|
| 5,610,731 A | * | 3/1997 | Itoh ........................ | H04N 1/031 358/474 |
| 5,734,483 A | * | 3/1998 | Itoh ........................ | H04N 1/031 358/474 |
| 6,026,261 A | * | 2/2000 | Peng .................... | H04N 1/1017 358/497 |
| 6,285,441 B1 | * | 9/2001 | Takahara ................. | H04N 1/03 355/67 |
| 6,407,526 B1 | * | 6/2002 | Black, III ............. | B60K 26/02 310/75 B |
| 6,424,435 B1 | * | 7/2002 | Kao .................... | H04N 1/00519 358/483 |

(Continued)

FOREIGN PATENT DOCUMENTS

JP 10-224569 A 8/1998

*Primary Examiner* — Cheukfan Lee
(74) *Attorney, Agent, or Firm* — Sughrue Mion, PLLC

(57) ABSTRACT

An image reading apparatus includes an image reading part that reads an image formed on a recording medium, an accommodating unit that accommodates the image reading part and supports the image reading part in such a manner that the image reading part is capable of being displaced toward a side on which the recording medium is to be disposed, and an urging member that urges, in the accommodating unit, the image reading part toward the side on which the recording medium is to be disposed. The accommodating unit includes an urging-member-mounting portion in which the urging member is mounted, and at least one window is formed in the urging-member-mounting portion on a side opposite to a side on which the image reading part is disposed.

20 Claims, 12 Drawing Sheets

(56) References Cited

U.S. PATENT DOCUMENTS

| | | | | |
|---|---|---|---|---|
| 6,453,140 B1* | 9/2002 | Hsu | H04N 1/1013 | 267/136 |
| 6,762,864 B2* | 7/2004 | Kao | H04N 1/04 | 358/474 |
| 7,768,679 B2* | 8/2010 | Yamaguchi | B41J 29/02 | 358/474 |
| 8,199,382 B2* | 6/2012 | Osakabe | H04N 1/1017 | 358/474 |
| 8,427,719 B2* | 4/2013 | Fujiwara | H04N 1/00002 | 358/488 |
| 9,538,032 B2* | 1/2017 | Ishizuka | H04N 1/00554 | |
| 2002/0179764 A1* | 12/2002 | Yamamoto | G11B 23/045 | 242/348.2 |
| 2004/0263917 A1* | 12/2004 | Hong | H04N 1/193 | 358/474 |
| 2005/0046912 A1* | 3/2005 | Nobe | H04N 1/121 | 358/498 |
| 2005/0270593 A1* | 12/2005 | Ma | H04N 1/1017 | 358/474 |
| 2007/0002397 A1* | 1/2007 | Osakabe | H04N 1/1017 | 358/474 |
| 2007/0201930 A1* | 8/2007 | Sugiura | B41J 19/20 | 400/354 |
| 2009/0034022 A1* | 2/2009 | Tamai | H04N 1/03 | 358/474 |
| 2011/0107618 A1* | 5/2011 | Kim | A43B 7/081 | 36/38 |
| 2013/0135692 A1* | 5/2013 | Uno | H04N 1/0057 | 358/474 |
| 2014/0104660 A1* | 4/2014 | Liu | H04N 1/1039 | 358/497 |
| 2014/0240801 A1* | 8/2014 | Kang | H04N 1/1065 | 358/497 |
| 2015/0237230 A1* | 8/2015 | Sugizaki | H04N 1/1065 | 358/497 |
| 2015/0281499 A1* | 10/2015 | Hamaguchi | H04N 1/00572 | 358/498 |

* cited by examiner

IMAGE READING APPARATUS

CROSS-REFERENCE TO RELATED APPLICATIONS

This application is based on and claims priority under 35 USC 119 from Japanese Patent Application No. 2015-142903 filed Jul. 17, 2015.

BACKGROUND

Technical Field

The present invention relates to an image reading apparatus.

SUMMARY

According to an aspect of the invention, there is provided an image reading apparatus including an image reading part that reads an image formed on a recording medium, an accommodating unit that accommodates the image reading part and supports the image reading part in such a manner that the image reading part is capable of being displaced toward a side on which the recording medium is to be disposed, and an urging member that urges, in the accommodating unit, the image reading part toward the side on which the recording medium is to be disposed. The accommodating unit includes an urging-member-mounting portion in which the urging member is mounted, and at least one window is formed in the urging-member-mounting portion on a side opposite to a side on which the image reading part is disposed.

BRIEF DESCRIPTION OF THE DRAWINGS

Exemplary embodiments of the present invention will be described in detail based on the following figures, wherein.

DETAILED DESCRIPTION

Exemplary embodiments of the present invention will now be described with reference to the drawings.

Figure 1:
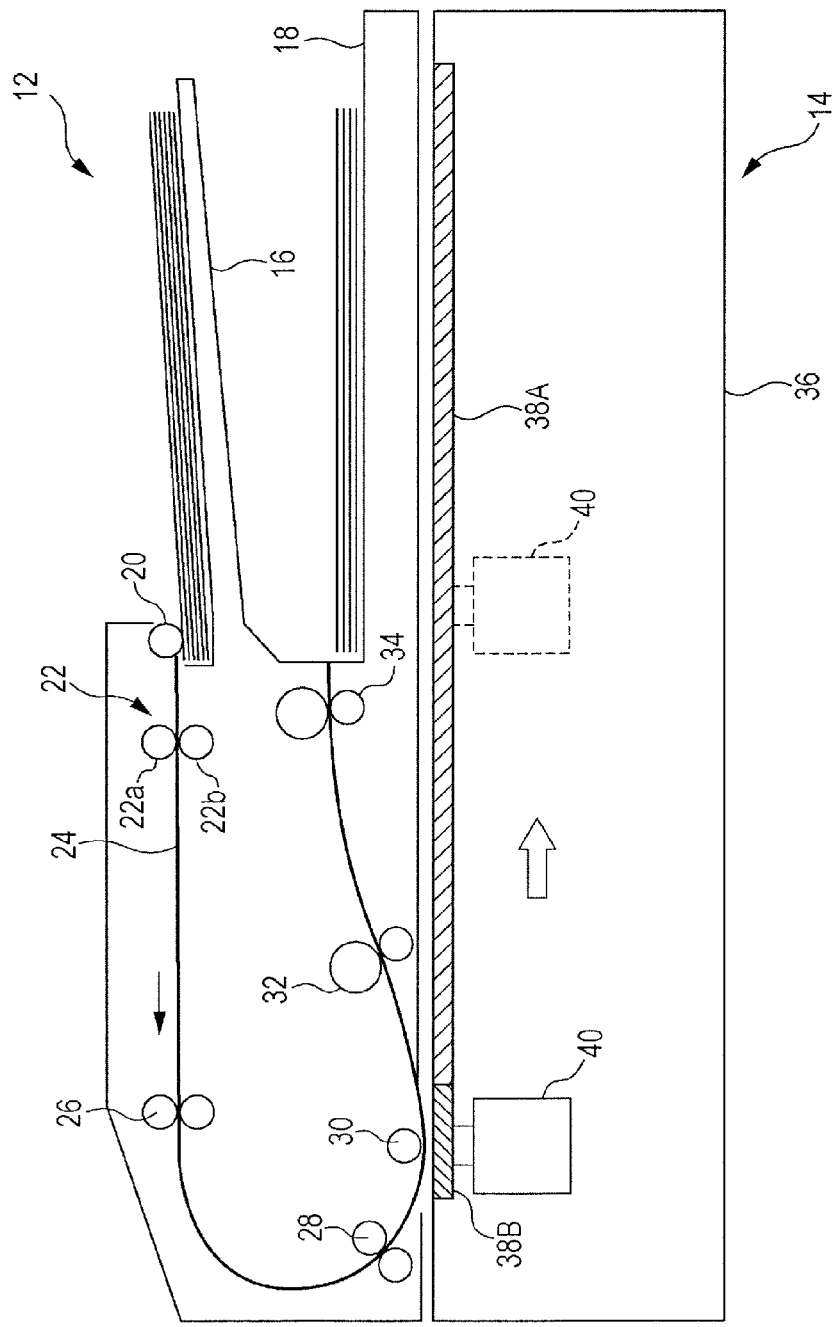
FIG. 1 is a diagram illustrating a schematic configuration of an image reading apparatus according to a first exemplary embodiment of the present invention.

FIG. 1 is a diagram illustrating the overall configuration of an image reading apparatus 10 according to a first exemplary embodiment. The image reading apparatus 10 includes a recording-medium-feed device 12 that sequentially transports recording media included in a group of recording media, which are stacked in a recording-medium-accommodating unit 16, and a scanner device 14 that reads images of the recording media by scanning the recording media.

The recording-medium-feed device 12 includes the recording-medium-accommodating unit 16, in which the group of recording media including the plural recording media are stacked, and an ejected-sheet-accommodating unit 18 that is disposed below the recording-medium-accommodating unit 16 and in which recording media that have been read are stacked. The recording-medium-feed device 12 further includes a pickup roller 20 that picks up and transports the recording media, which are stacked in the recording-medium-accommodating unit 16. In addition, a separation mechanism 22 that separates the recording media one by one is disposed further downstream than the pickup roller 20 in a transport direction of the recording media. The separation mechanism 22 includes a feed roller 22a that transports the recording media fed by the pickup roller 20 further toward the downstream side and a retard roller 22b that separates the recording media fed by the pickup roller 20 one by one. Each of the recording media is to be transported along a transport path 24, and the following rollers are disposed on the transport path 24 in this order starting from an upstream side in the transport direction of the recording media: pre-registration rollers 26, registration rollers 28, a platen roller 30, out rollers 32, and ejection rollers 34. The pre-registration rollers 26 transport one of the recording media, which has been separated from the rest of recording media, toward the rollers, which are positioned further downstream than the pre-registration rollers 26, and form the recording medium into a loop. The registration rollers 28 temporarily stop rotating and thereafter start rotating again at a predetermined timing. Then, the registration rollers 28 supply the recording medium to an image reading part, which will be described later, while performing registration adjustment. The platen roller 30 assists transportation of one of the recording media that is being read by the scanner device 14. The out rollers 32 transport one of the recording media that has been read by the scanner device 14 further toward the downstream side. The ejection rollers 34 further transport the recording medium, which has been read, and eject the recording medium to the ejected-sheet-accommodating unit 18.

On the other hand, the scanner device 14 supports the above-described recording-medium-feed device 12 by a device frame 36 in such a manner that the recording-medium-feed device 12 is capable of being opened and closed and reads images of the recording media transported by the recording-medium-feed device 12. The scanner device 14 includes the device frame 36, which forms a housing of the scanner device 14, a first platen glass 38A on which one of the recording media whose image is to be read may be placed in a stationary state, and a second platen glass 38B that has a light opening used for reading the recording media transported by the recording-medium-feed device 12.

The scanner device 14 is provided with a contact image sensor (CIS) 40, which serves as the image reading part that reads an image while in a stationary state below the second platen glass 38B or by scanning the entire first platen glass 38A. The scanner device 14 further includes a control-and-image processing unit (not illustrated). The control-and-image processing unit performs predetermined processing on image data of one of the recording media input from the CIS 40, which will be described in detail later. In addition, the control-and-image processing unit controls the operation of each unit during a reading operation performed by the image reading apparatus 10.

In a stationary reading mode in which an image of one of the recording media placed on the first platen glass 38A is read, the CIS 40 is caused to move in a scanning direction (the direction of an arrow in FIG. 1) in such a manner as to scan the entirety of the recording medium, so that a reading operation for the recording medium, which is a page, is completed.

On the other hand, in a transport reading mode in which an image of one of the recording media transported by the recording-medium-feed device 12 is read, the recording medium, which is transported, passes over the second platen glass 38B. The second platen glass 38B is formed of, for example, a transparent-glass plate having an elongated plate-like shape. In this case, the CIS 40 is stationary at a position indicated by a solid line in FIG. 1. Then, the image of the recording medium, which has passed through the platen roller 30 of the recording-medium-feed device 12, is read by the CIS 40, so that a reading operation for the recording medium, which is a page, is completed.

Figure 2:
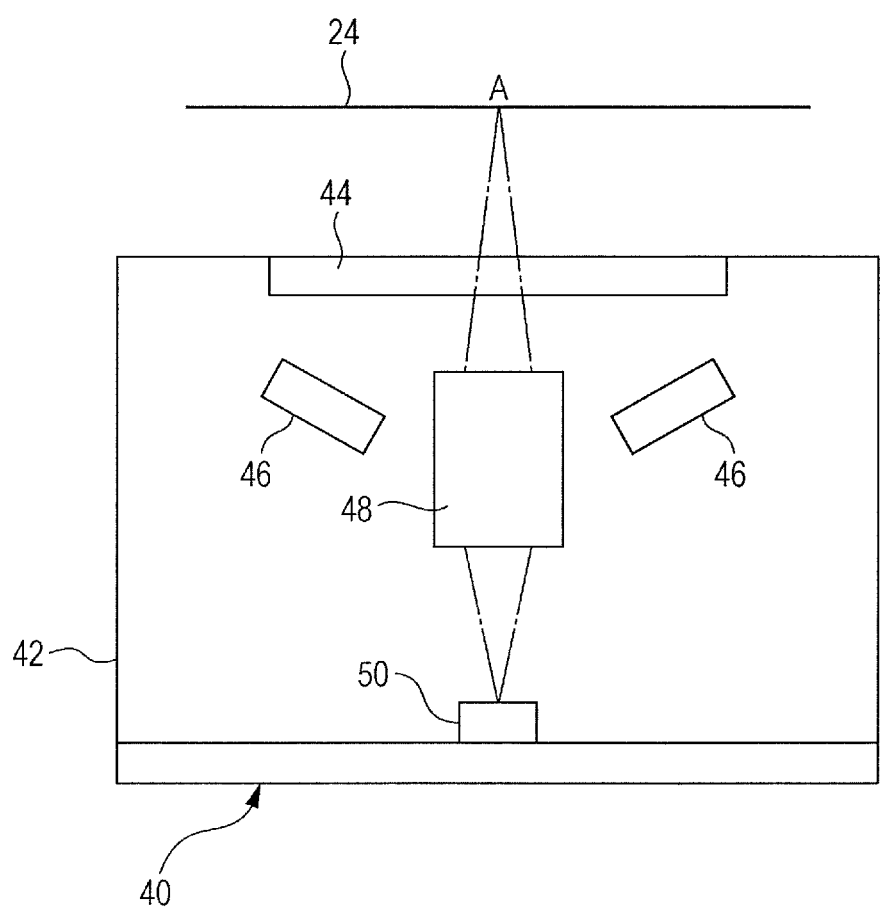
FIG. 2 is a diagram illustrating an internal structure of a contact image sensor (CIS) according to the first exemplary embodiment of the present invention.

FIG. 2 is a diagram illustrating the configuration of the CIS 40.

In the CIS 40, an image of one of the recording media is read on a side of the first platen glass 38A or the second platen glass 38B furthest from the CIS 40. The CIS 40 includes a CIS body 42, a glass 44, light emitting diode (LED) arrays 46, a rod lens array 48, and a line sensor 50.

Among these components, the glass 44 is mounted on an opening, which is formed in the CIS body 42 on the side on which the transport path 24 is present. The LED arrays 46 radiate light onto the recording medium through the glass 44. The rod lens array 48 converges reflected light that is the light, which has been radiated by the LED arrays 46 and which has been reflected, on a reading position A. The line sensor 50 reads the light that has been converged by the rod lens array 48. As the line sensor 50, a CCD sensor, a CMOS sensor, a CIS sensor, or the like may be used, and the line sensor 50 may read an image whose actual width is, for example, an A4 longitudinal width of 297 mm. In other words, the CIS 40 captures an image by not using a reducing optical system but using a so-called life-size optical system using the rod lens array 48 and the line sensor 50.

Figure 3:
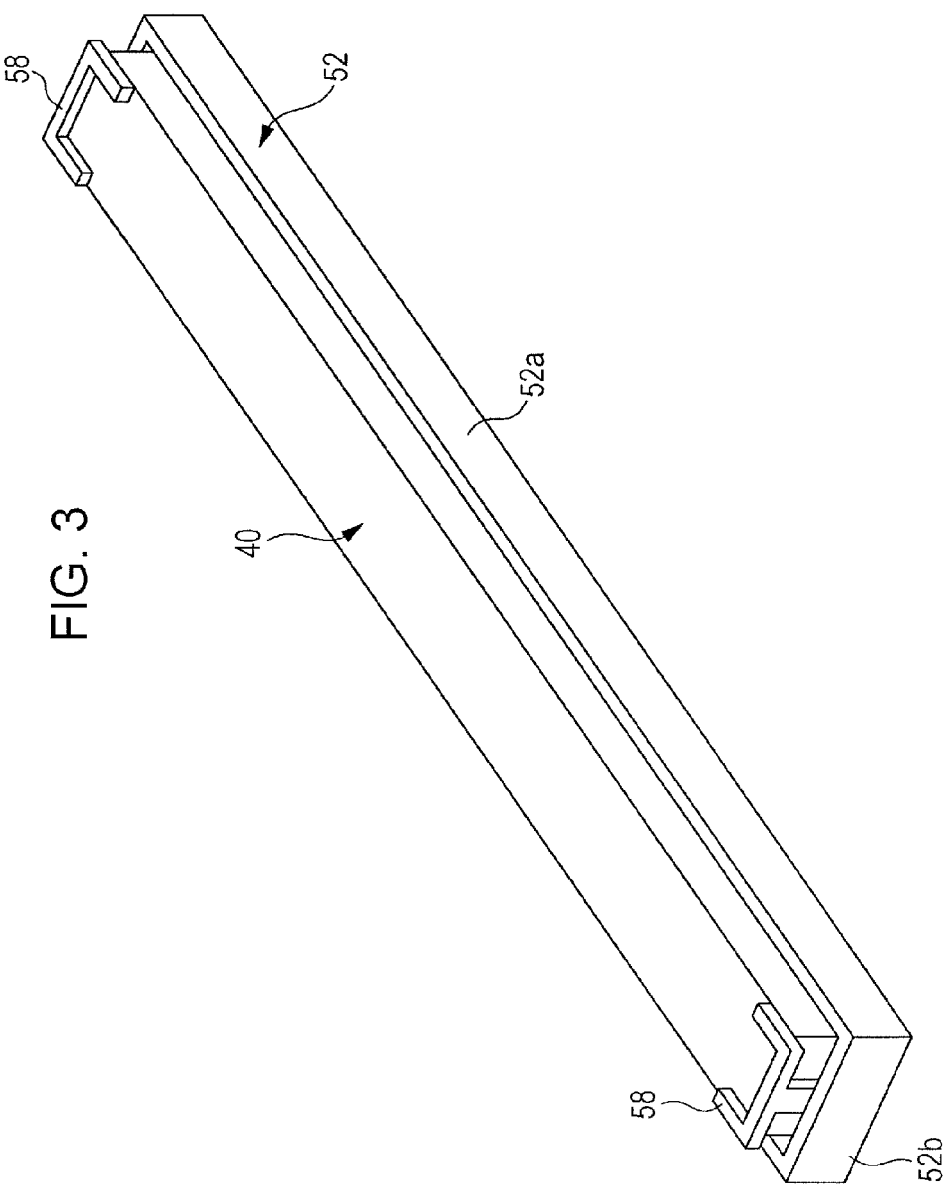
FIG. 3 is a perspective view illustrating a state in which the CIS according to the first exemplary embodiment of the present invention is accommodated in a housing.

FIG. 3 is a perspective view illustrating a state in which the CIS 40 is accommodated in a housing 52.

Figure 4:
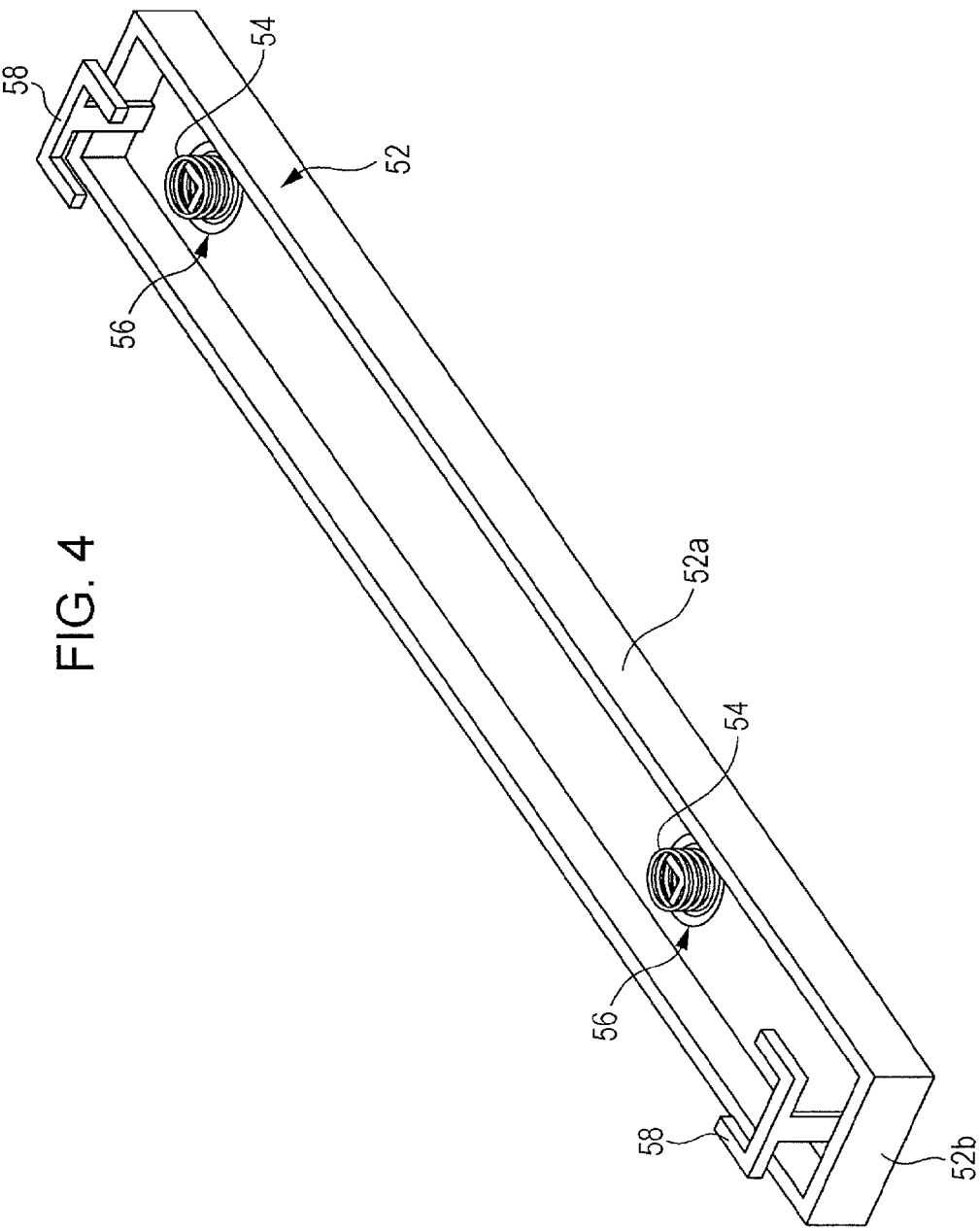
FIG. 4 is a perspective view illustrating a state in which the CIS according to the first exemplary embodiment of the present invention has been removed from the housing.

FIG. 4 is a perspective view illustrating a state in which the CIS 40 has been removed from the housing 52.

Figure 5:
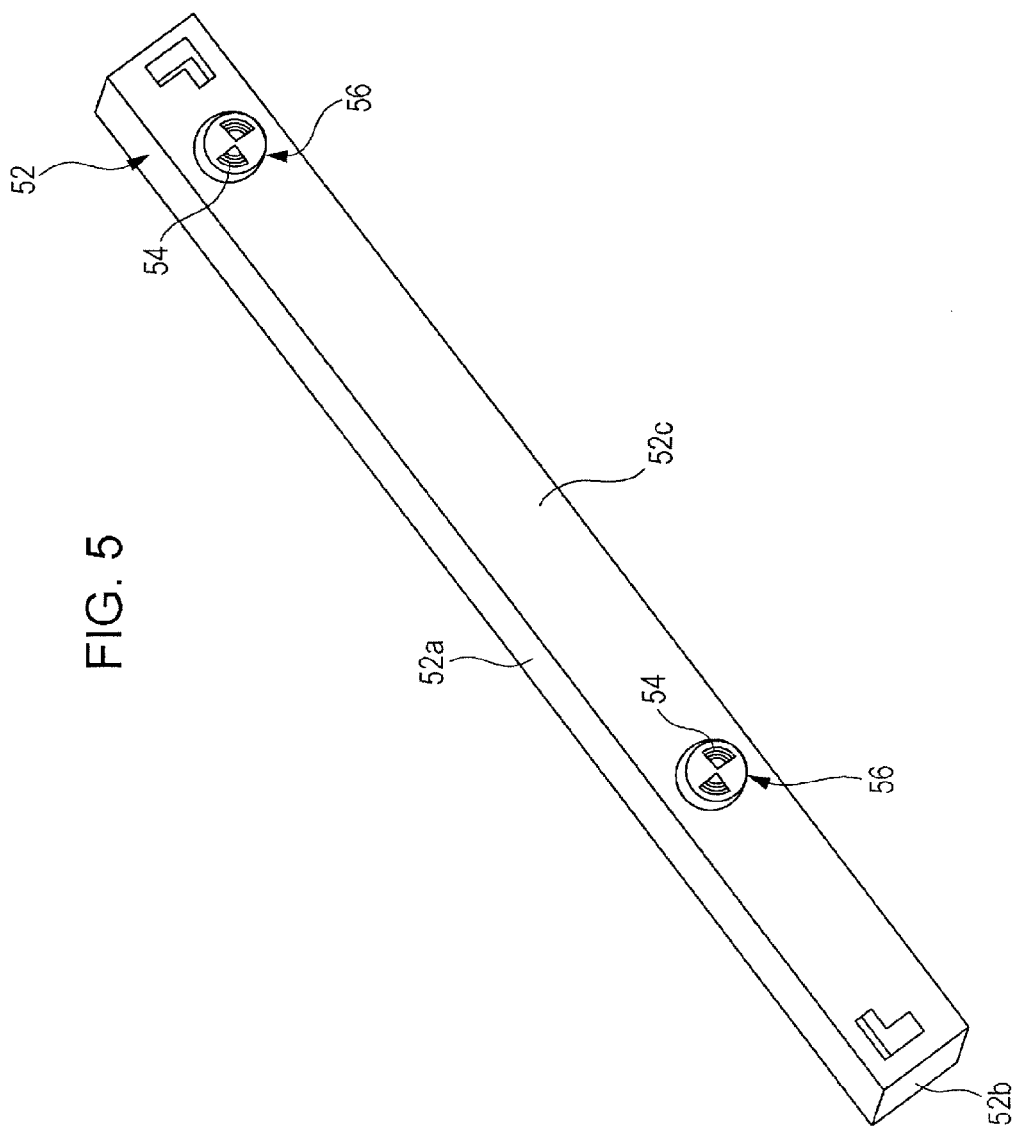
FIG. 5 is a perspective view illustrating the housing illustrated in FIG. 4 as viewed from the rear surface side of the housing.

FIG. 5 is a perspective view illustrating the housing 52 illustrated in FIG. 4 as viewed from the rear surface side of the housing 52.

Figure 6:
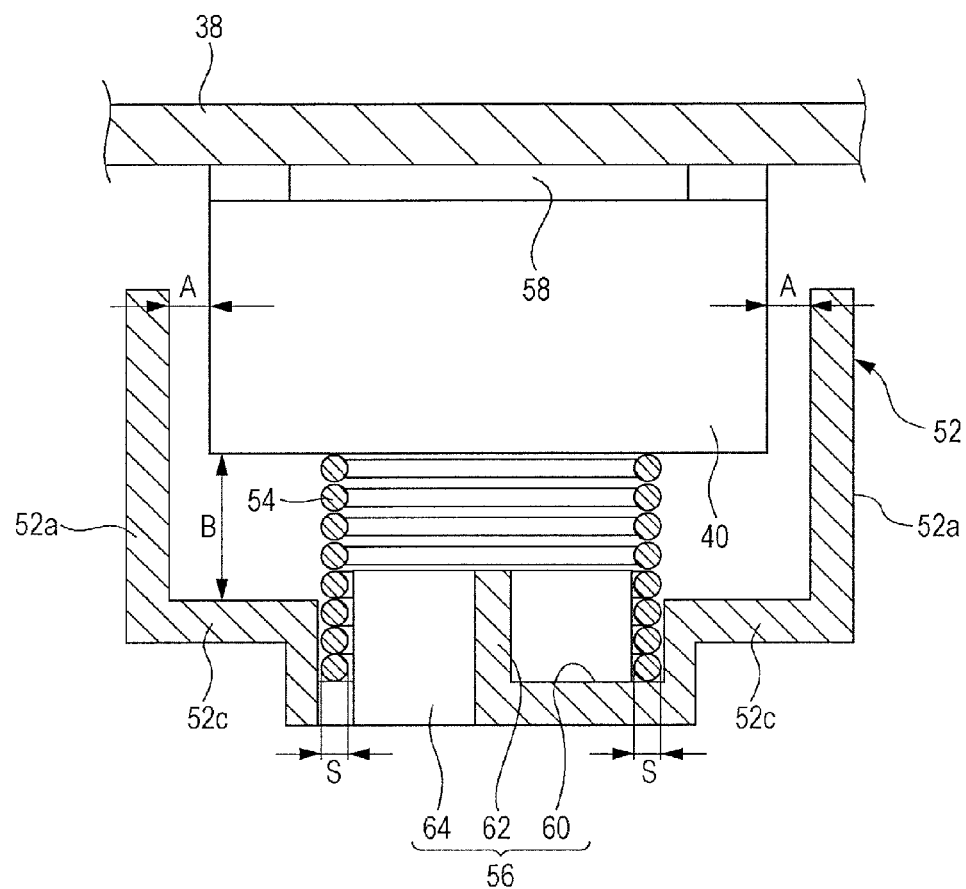
FIG. 6 is a diagram illustrating a configuration of the peripheral portion of the CIS according to the first exemplary embodiment of the present invention.

FIG. 6 is a diagram illustrating the configuration of the peripheral portion of the CIS 40.

The CIS 40 is accommodated in the housing 52, which serves as an accommodating unit.

The housing 52 has a box shape and includes first surfaces 52a and 52a covering the CIS 40 in the longitudinal direction of the CIS 40, second surfaces 52b and 52b covering the CIS 40 in the lateral direction of the CIS 40, and a third surface 52c covering a bottom surface of the CIS 40.

A gap A is formed between the first surfaces 52a and 52a and the CIS 40. A gap B is formed between the third surface 52c and the CIS 40.

Plural (two in the first exemplary embodiment) urging-member-mounting portions 56 are formed in a bottom surface (third surface 52c) of the housing 52. Urging members 54 each of which is for example, a compression-coil spring or the like are to be mounted in the urging-member-mounting portions 56. A lower end portion of each of the urging members 54 is mounted in the corresponding urging-member-mounting portion 56, and the CIS 40 is supported by the urging members 54 in the housing 52 in such a manner as to be capable of being displaced within the gap A and the gap B and is pressed by the urging members 54 toward the first platen glass 38A or the second platen glass 38B (toward the side on which the recording media are disposed).

Sliding members 58 and 58 each having slidability with respect to the first platen glass 38A or the second platen glass 38B are disposed on the end portions of the housing 52 in the longitudinal direction of the housing 52. Each of the sliding members 58 and 58 has, for example, a U shape and is formed in such a manner as to cover one of edges of the CIS 40 facing the first platen glass 38A or the second platen glass 38B.

The CIS 40 is pressed against the first platen glass 38A or the second platen glass 38B via the sliding members 58 and 58, and an image of one of the recording media that is placed on the first platen glass 38A or that passes over the second platen glass 38B is read by the CIS 40.

Figure 7A:
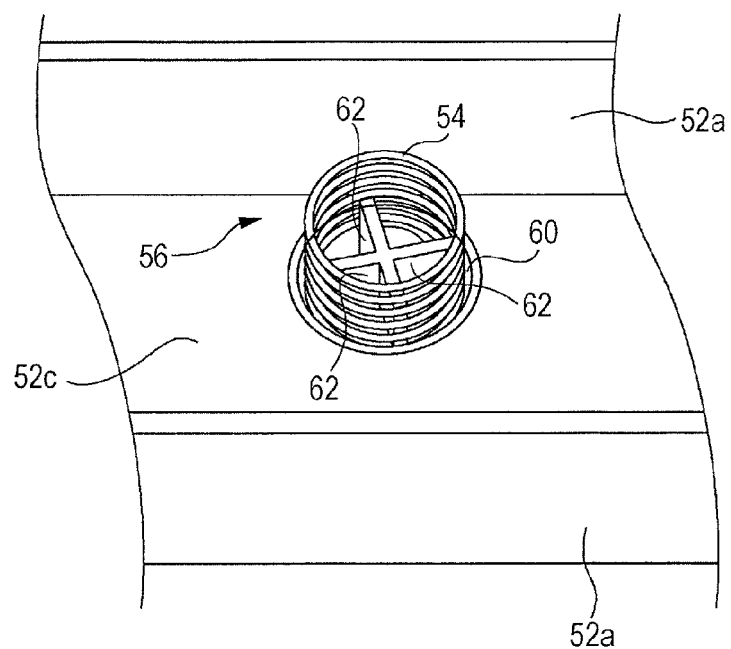
FIGS. 7A and 7B are respectively a perspective view illustrating the periphery of an urging-member-mounting portion according to the first exemplary embodiment of the present invention as seen from the side on which the CIS is mounted and a perspective view illustrating the periphery of the urging-member-mounting portion as seen from the side opposite to the side illustrated in FIG. 7A.
Figure 7B:
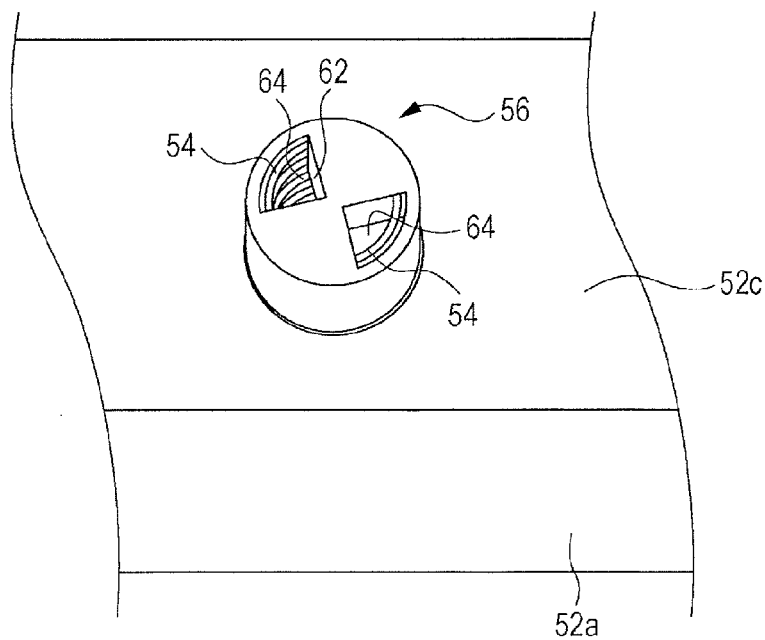

FIGS. 7A and 7B are respectively a perspective view illustrating the periphery of one of the urging-member-mounting portions 56 according to the first exemplary embodiment of the present invention as seen from the side on which the CIS 40 is mounted and a perspective view illustrating the periphery of the urging-member-mounting portion 56 as seen from the side opposite to the side illustrated in FIG. 7A.

The urging-member-mounting portion 56 includes a recess portion 60, a projecting portion 62 that projects, in the recess portion 60, toward the side on which the CIS 40 is mounted, and windows 64 that are formed in such a manner as to extend through a bottom surface of the recess portion 60. The recess portion 60 is recessed in a circular shape from, for example, the bottom surface (third surface 52c) of the housing 52 toward the side opposite to the side on which the CIS 40 is mounted.

The projecting portion 62 has, for example, a cross shape or a substantially cross shape.

The lower end portion of one of the urging members 54 is inserted into a space S, which is defined by the inner peripheral surface of the recess portion 60 and ends of the projecting portion 62, and the urging member 54 is held, at four points, by the ends of the projecting portion 62 having a cross shape or a substantially cross shape and supported by the bottom surface of the recess portion 60. As a result, the CIS 40 is supported in such a manner as to be capable of being displaced within the housing 52.

The windows 64 are formed in such a manner as to extend through the bottom surface of the recess portion 60 by removing portions of the bottom surface of the recess portion 60 each into a fan-like shape, the portions being positioned on a first diagonal line, while leaving a bottom surface of the projecting portion 62, which has a cross shape or a substantially cross shape, and the other portions of the bottom surface of the recess portion 60, the other portions being positioned on a second diagonal line.

An assembly operation performed when mounting the CIS 40 in the image reading apparatus 10 will now be described.

First, the urging members 54 are mounted in the urging-member-mounting portions 56 of the housing 52. More specifically, the urging members 54 are disposed in the recess portions 60 in such a manner that the lower end portion of each of the urging members 54 is held by the corresponding projecting portion 62 at four points.

Next, the CIS 40 is mounted in the housing 52.

Then, the CIS 40 is arranged at a position facing the first platen glass 38A or the second platen glass 38B.

Figure 8A:
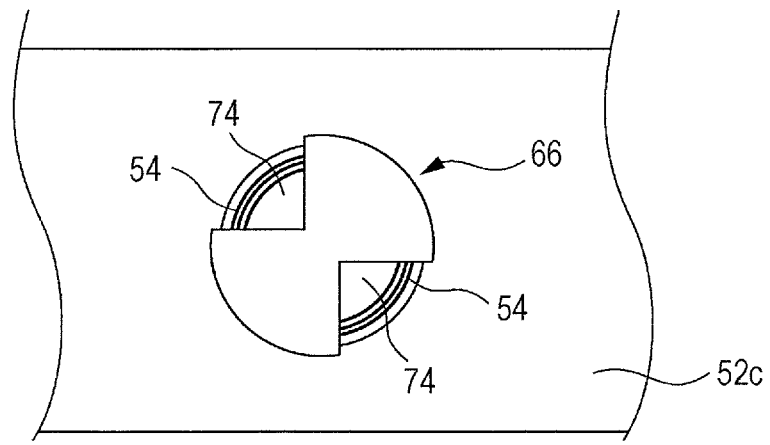
FIGS. 8A and 8B are respectively a top view of an urging-member-mounting portion according to a second exemplary embodiment of the present invention when viewed from the side opposite to the side on which the CIS is mounted and a perspective view of the urging-member-mounting portion when viewed from the side opposite to the side on which the CIS is mounted.
Figure 8B:
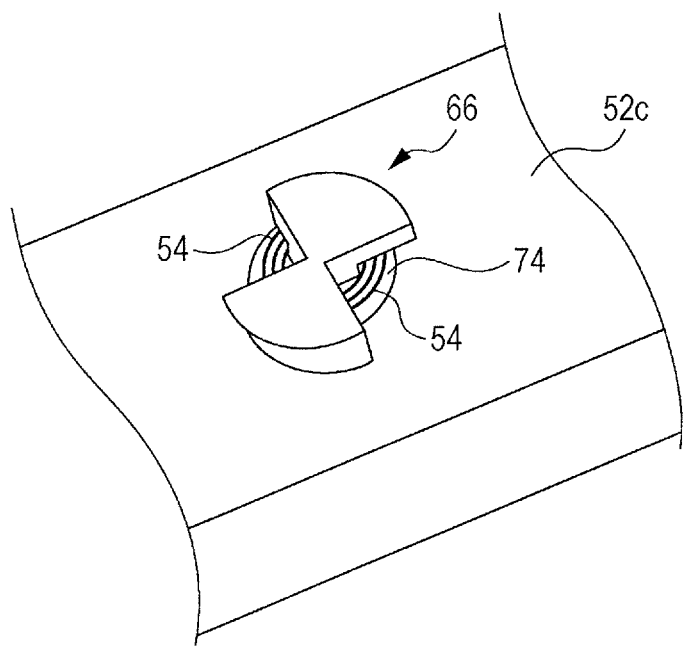

FIGS. 8A and 8B are respectively a top view of an urging-member-mounting portion 66 according to a second exemplary embodiment of the present invention when viewed from the side opposite to the side on which the CIS 40 is mounted and a perspective view of the urging-member-mounting portion 66 when viewed from the side opposite to the side on which the CIS 40 is mounted.

The only difference between the urging-member-mounting portion 66 and the urging-member-mounting portions 56 according to the above-described first exemplary embodiment is the shapes of windows.

Windows 74 according to the second exemplary embodiment are formed in such a manner as to extend through the bottom surface of the recess portion 60 by cutting out portions of the bottom surface of the recess portion 60, the portions being positioned on a first diagonal line, while leaving the bottom surface of the projecting portion 62, which has a cross shape or a substantially cross shape, and the other portions of the bottom surface of the recess portion 60, the other portions being positioned on a second diagonal line. When viewed from the rear surface side of the housing 52, the two windows 74 are each formed into a fan-like shape on the first diagonal line by cutting out the bottom surface of the recess portion 60, and accordingly, portions of the urging member 54 may be visually recognized through the windows 74. In addition to the bottom surface of the recess portion 60 on a rear surface side of the CIS 40, the side surface of the recess portion 60 is also partially cut away.

Figure 9A:
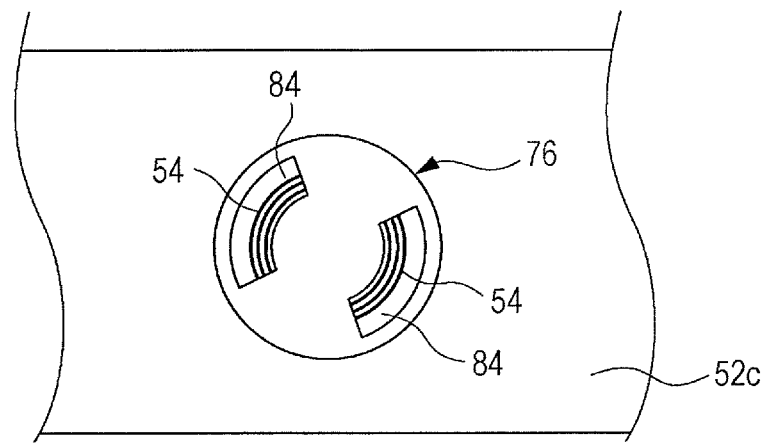
FIGS. 9A and 9B are respectively a top view of an urging-member-mounting portion according to a third exemplary embodiment of the present invention when viewed from the side opposite to the side on which the CIS is mounted and a perspective view of the urging-member-mounting portion when viewed from the side opposite to the side on which the CIS is mounted.
Figure 9B:
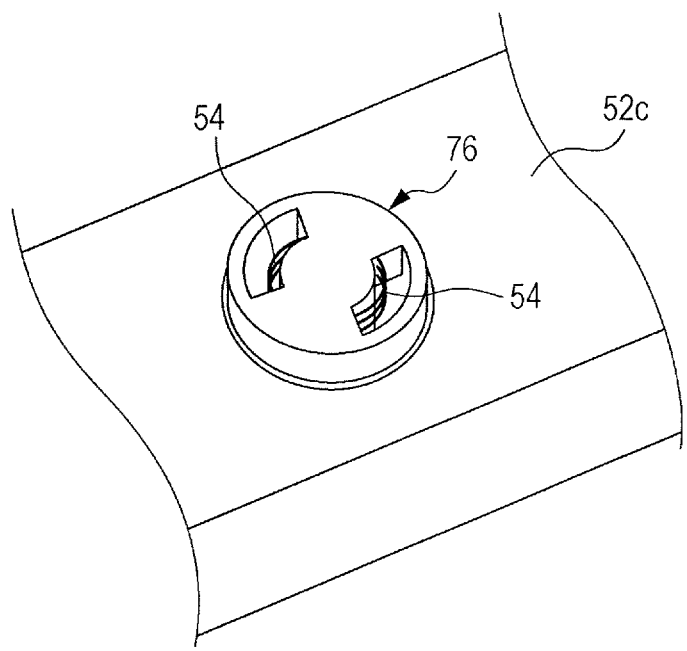

FIGS. 9A and 9B are respectively a top view of an urging-member-mounting portion 76 according to a third exemplary embodiment of the present invention when viewed from the side opposite to the side on which the CIS 40 is mounted and a perspective view of the urging-member-mounting portion 76 when viewed from the side opposite to the side on which the CIS 40 is mounted.

The only difference between the urging-member-mounting portion 76 and the urging-member-mounting portions 56 and 66 according to the above-described first and second exemplary embodiments is the shapes of windows.

Windows 84 according to the third exemplary embodiment are formed in such a manner as to extend through the bottom surface of the recess portion 60 by removing portions of the bottom surface of the recess portion 60 each into an arc shape, the portions being positioned on a first diagonal line, while leaving the bottom surface of the projecting portion 62, which has a cross shape or a substantially cross shape, and the other portions of the bottom surface of the recess portion 60, the other portions being positioned on a second diagonal line. When viewed from the rear surface side of the housing 52, the two windows 84 are each formed into an arc shape on the first diagonal line by cutting out the bottom surface of the recess portion 60. In addition, the area of the bottom surface of the recess portion 60 that is cut away is small, and this configuration may also be employed in the case where the shape of the projecting portion 62, which holds the urging member 54, is a columnar shape or a substantially columnar shape, a cylindrical shape, or the like instead of a cross shape or a substantially cross shape.

Figure 10A:
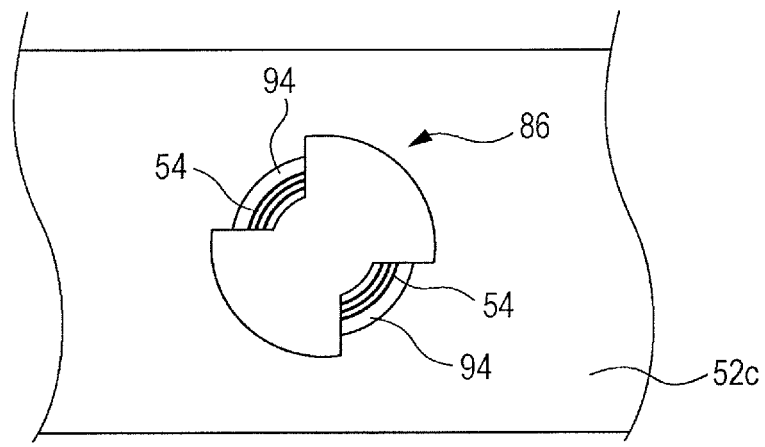
FIGS. 10A and 10B are respectively a top view of an urging-member-mounting portion according to a fourth exemplary embodiment of the present invention when viewed from the side opposite to the side on which the CIS is mounted and a perspective view of the urging-member-mounting portion when viewed from the side opposite to the side on which the CIS is mounted.
Figure 10B:
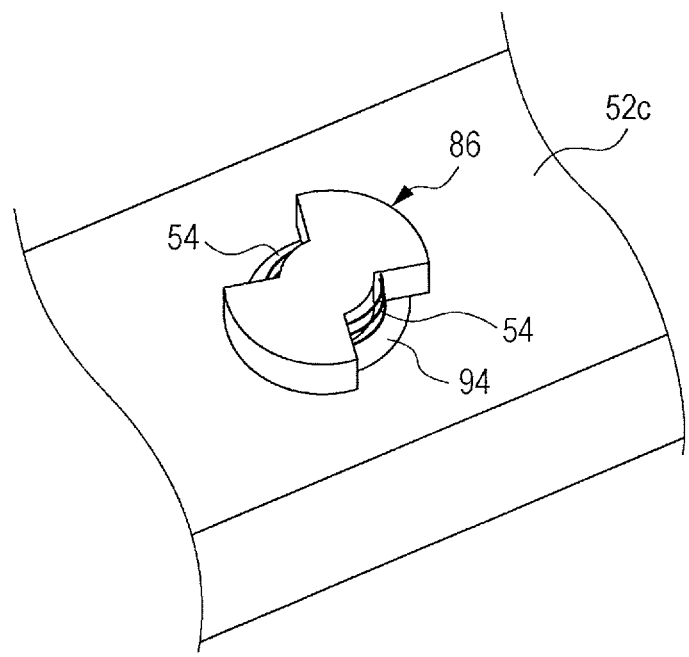

FIGS. 10A and 10B are respectively a top view of an urging-member-mounting portion 86 according to a fourth exemplary embodiment of the present invention when viewed from the side opposite to the side on which the CIS 40 is mounted and a perspective view of the urging-member-mounting portion 86 when viewed from the side opposite to the side on which the CIS 40 is mounted.

The only difference between the urging-member-mounting portion 86 and the urging-member-mounting portions 56, 66, and 76 according to the above-described first to third exemplary embodiments is the shapes of windows.

Windows 94 according to the fourth exemplary embodiment are formed in such a manner as to extend through the bottom surface of the recess portion 60 by removing portions of the bottom surface of the recess portion 60 each into a fan-like shape, the portions being positioned on a first diagonal line, while leaving the bottom surface of the projecting portion 62, which has a cross shape or a substantially cross shape, and the other portions of the bottom surface of the recess portion 60, the other portions including portions positioned on a second diagonal line and a portion at the center of the bottom surface of the recess portion 60. When viewed from the rear surface side of the housing 52, the two windows 94 are each formed into a fan-like shape on the first diagonal line by cutting out the bottom surface of the recess portion 60 while leaving the center portion of the bottom surface of the recess portion 60. In addition to the bottom surface of the recess portion 60 on the rear surface side of the CIS 40, the side surface of the recess portion 60 is also partially cut away, and thus, the urging member 54 may be seen in a brighter state compared with the configuration in which the side surface of the recess portion 60 is not partially cut away. In addition, an inner surface of the urging member 54 is held as a portion of the bottom surface of the recess portion 60, and thus, this configuration may also be employed in the case where the shape of the projecting portion 62, which holds the urging member 54, is a columnar shape or a substantially columnar shape, a cylindrical shape, or the like instead of a cross shape or a substantially cross shape.

Figure 11A:
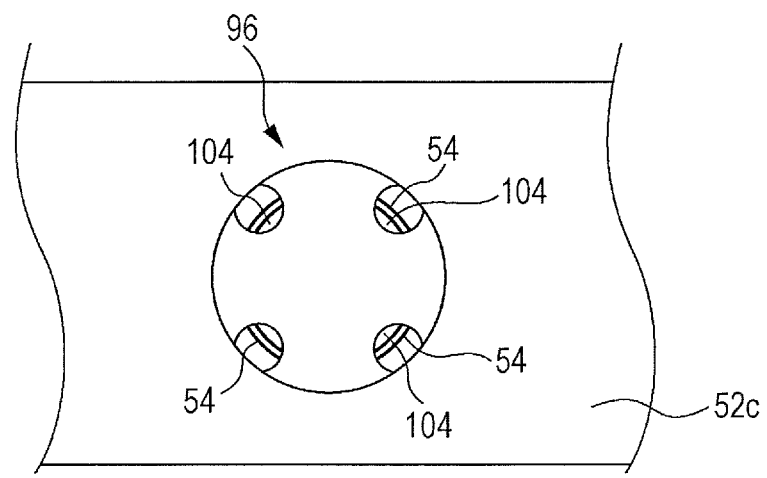
FIGS. 11A and 11B are respectively a top view of an urging-member-mounting portion according to a fifth exemplary embodiment of the present invention when viewed from the side opposite to the side on which the CIS is mounted and a perspective view of the urging-member-mounting portion when viewed from the side opposite to the side on which the CIS is mounted.
Figure 11B:
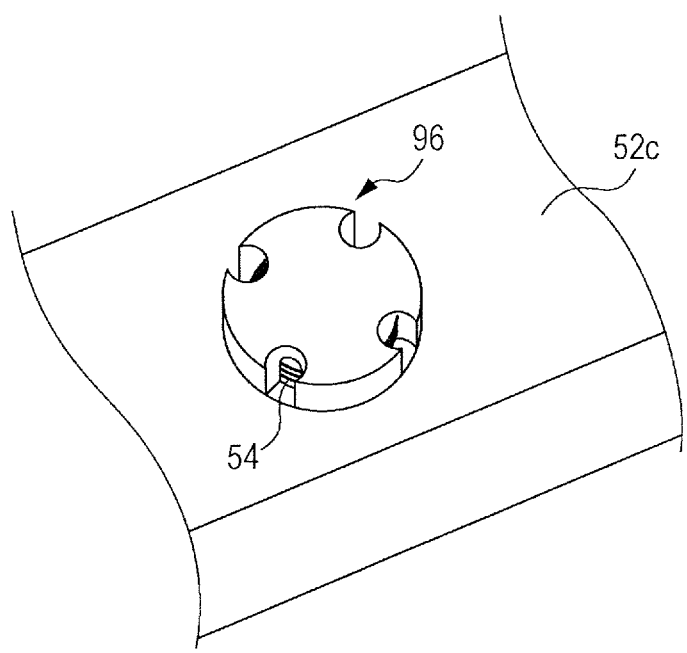

FIGS. 11A and 11B are respectively a top view of an urging-member-mounting portion 96 according to a fifth exemplary embodiment of the present invention when viewed from the side opposite to the side on which the CIS 40 is mounted and a perspective view of the urging-member-mounting portion 96 when viewed from the side opposite to the side on which the CIS 40 is mounted.

The only difference between the urging-member-mounting portion 96 and the urging-member-mounting portions 56, 66, 76, and 86 according to the above-described first to fourth exemplary embodiments is the shapes of windows.

Windows 104 according to the fifth exemplary embodiment are formed in such a manner as to extend through the bottom surface of the recess portion 60 by removing portions of the bottom surface of the recess portion 60 each into a semicircular shape, while leaving the bottom surface of the projecting portion 62, which has a cross shape or a substantially cross shape. When viewed from the rear surface side of the housing 52, the four windows 104 are each formed into a semicircular shape on diagonal lines by cutting out the bottom surface of the recess portion 60, while leaving the bottom surface of the projecting portion 62. Although the area of the bottom surface of the recess portion 60 that is cut away is small, since the side surface of the recess portion 60 is also partially cut away in addition to the bottom surface of the recess portion 60, the urging member 54 and also the outer ring of the urging member 54 may be seen in a brighter state compared with the configuration in which the side surface of the recess portion 60 is not partially cut away. Furthermore, this configuration may also be employed in the case where the shape of the projecting portion 62, which holds the urging member 54, is a columnar shape or a substantially columnar shape, a cylindrical shape, or the like instead of a cross shape or a substantially cross shape.

Figure 12A:
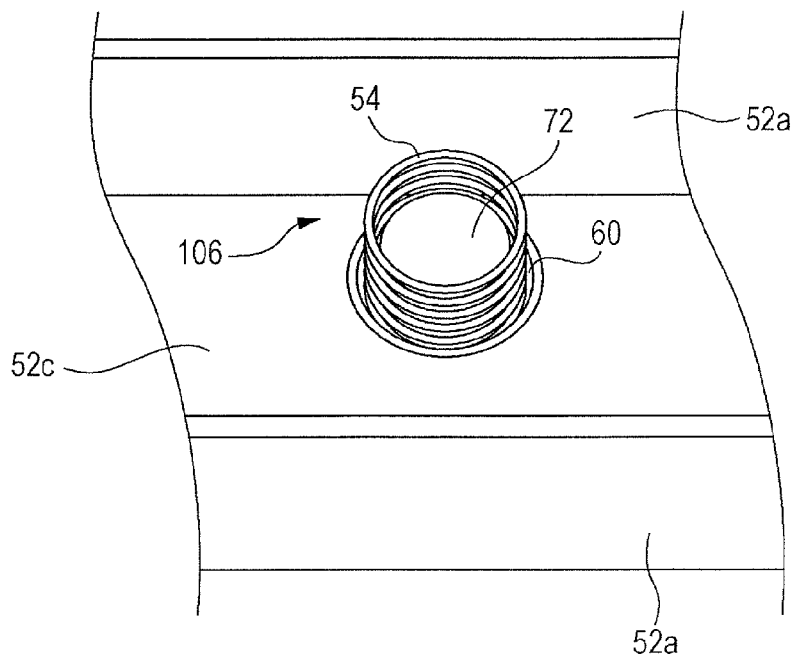
FIGS. 12A and 12B are respectively a perspective view illustrating the periphery of an urging-member-mounting portion according to a sixth exemplary embodiment of the present invention on the side on which the CIS is mounted and a sectional view illustrating a configuration of the peripheral portion of the CIS.
Figure 12B:
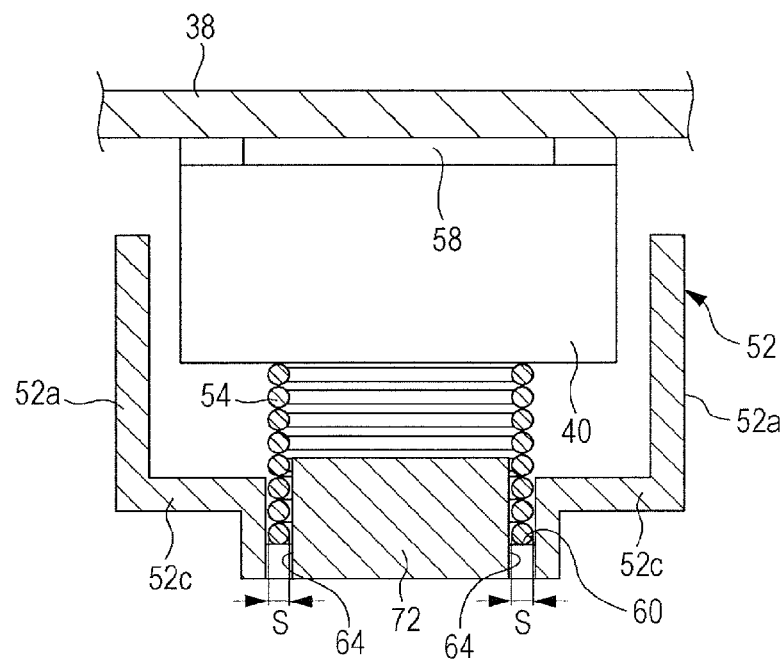

FIGS. 12A and 12B are respectively a perspective view illustrating the periphery of an urging-member-mounting portion 106 according to a sixth exemplary embodiment of the present invention on the side on which the CIS 40 is mounted and a sectional view illustrating the configuration of the peripheral portion of the CIS 40.

The difference between the urging-member-mounting portion 106 and the urging-member-mounting portions 56, 66, 76, 86, and 96 according to the above-described first to fifth exemplary embodiments is the shape of a projecting portion.

A projecting portion 72 according to the sixth exemplary embodiment has a columnar shape or a substantially columnar shape, and the lower end portion of one of the urging members 54 is held at the periphery of the projecting portion 72.

In the sixth exemplary embodiment, for example, the shapes of the windows 84 of the third exemplary embodiment, the shapes of the windows 94 of the fourth exemplary embodiment, the shapes of the windows 104 of the fifth exemplary embodiment, which have been described above, and the like may be employed as the shapes of windows that are formed in the recess portion 60.

The present invention is not limited to the above-described exemplary embodiments, and the shapes of the windows are not limited to those described in the above exemplary embodiments as long as each of the urging members 54 in a mounted state may be visually recognized while the lower end portions of the urging members 54 are held.

Although the configuration in which the windows extend through the bottom surface of the recess portion 60 has been described in the above-described exemplary embodiments, the present invention is not limited to this configuration, and each of the windows may be covered with a transparent member or the like so as not to extend through the bottom surface of the recess portion 60.

Although the configuration in which each of the urging-member-mounting portions includes the recess portion 60 has been described in the above-described exemplary embodiments, the present invention is not limited to this configuration, and each of the urging-member-mounting portions does not need to include the recess portion 60.

Although the case where each of the projecting portions has a cross shape or a substantially cross shape and the case where each of the projecting portions has a columnar shape or a substantially columnar shape have been described in the above-described exemplary embodiments, considering the formation of the windows, each of the projecting portions may have a cross shape or a substantially cross shape.

Although the case where each of the projecting portions has a cross shape or a substantially cross shape and the case where each of the projecting portions has a columnar shape or a substantially columnar shape have been described in the above-described exemplary embodiments, the present invention is not limited to these cases, and each of the projecting portions may have any shape as long as the projecting portion is capable of holding the lower end portion of one of the urging members 54.

As described above, the present invention may be applied to image forming apparatuses such as, for example, copying machines, printers, scanners, and facsimile machines.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
   an image reading part that reads an image formed on a recording medium;
   an accommodating unit that accommodates the image reading part and supports the image reading part in such a manner that the image reading part is capable of being displaced toward a side on which the recording medium is to be disposed; and
   an urging member that urges, in the accommodating unit, the image reading part toward the side on which the recording medium is to be disposed,
   wherein the accommodating unit includes an urging-member-mounting portion in which the urging member is mounted, wherein at least one window is formed in the urging-member-mounting portion on a side opposite to a side on which the image reading part is disposed, wherein the urging member abuts a wall which longitudinally extends in a direction substantially perpendicular to a direction in which the urging member urges the image reading part, wherein the window is formed in the wall, wherein in a radial direction of the urging member, the window extends further away from a center of the urging member than a circumference of a portion of the urging member abutting the wall, and wherein in the radial direction, an innermost opening of the wall is closer to a radial, outer-edge of the spring than to a radial center of the spring, the innermost opening being a closest portion of the window to the radial center of the spring.

2. The image reading apparatus according to claim 1, wherein the urging member-mounting portion includes a projecting portion projecting toward the side on which the image reading part is disposed.

3. The image reading apparatus according to claim 2, wherein the projecting portion projects in a substantially cross shape.

4. The image reading apparatus according to claim 3, wherein the urging-member-mounting portion includes a recess portion in which the urging member is disposed.

5. The image reading apparatus according to claim 4, wherein the at least one window includes at least two windows that are formed on a diagonal line.

6. The image reading apparatus according to claim 3, wherein the at least one window includes at least two windows that are formed on a diagonal line.

7. The image reading apparatus according to claim 2, wherein the projecting portion projects in a substantially columnar shape.

8. The image reading apparatus according to claim 7, wherein the urging-member-mounting portion includes a recess portion in which the urging member is disposed.

9. The image reading apparatus according to claim 8, wherein the at least one window includes at least two windows that are formed on a circular surface and arranged oppositely of each other on the circular surface.

10. The image reading apparatus according to claim 7, wherein the at least one window includes at least two windows that are formed on a circular surface and arranged oppositely of each other on the circular surface.

11. The image reading apparatus according to claim 2, wherein the urging-member-mounting portion includes a recess portion in which the urging member is disposed.

12. The image reading apparatus according to claim 11, wherein the at least one window includes at least two windows that are formed on a circular surface and arranged oppositely of each other on the circular surface.

13. The image reading apparatus according to claim 2, wherein the at least one window includes at least two windows that are formed on a circular surface and arranged oppositely of each other on the circular surface.

14. The image reading apparatus according to claim 2, wherein the projecting portion extends through the urging member from an inner edge of the window, the inner edge of the window being a portion of the window closest to the center of the urging member in the radial direction.

15. The image reading apparatus according to claim 1, wherein the urging-member-mounting portion includes a recess portion in which the urging member is disposed.

16. The image reading apparatus according to claim 15, wherein the at least one window includes at least two windows that are formed on a circular surface and arranged oppositely of each other on the circular surface.

17. The image reading apparatus according to claim 1, wherein the at least one window includes at least two windows that are formed on a circular surface and arranged oppositely of each other on the circular surface.

18. The image reading apparatus according to claim 17, wherein each of the windows is substantially a same shape and the windows are arranged on the circular surface with equal space therebetween along a circumference of the circular surface, and wherein the wall comprises the circular surface.

19. The image reading apparatus according to claim 1, wherein the at least one window is a through hole.

20. The image reading apparatus according to claim 1, wherein, in the radial direction, the wall extends concentrically about a majority of the spring in the radial direction and is concentrically open about the window in the radial direction extending away from the center of the spring such that a plurality of secondary walls are cut into outermost portions of the wall in directions towards the radial center of the spring.

* * * * *